United States Patent Office 2,730,445
Patented Jan. 10, 1956

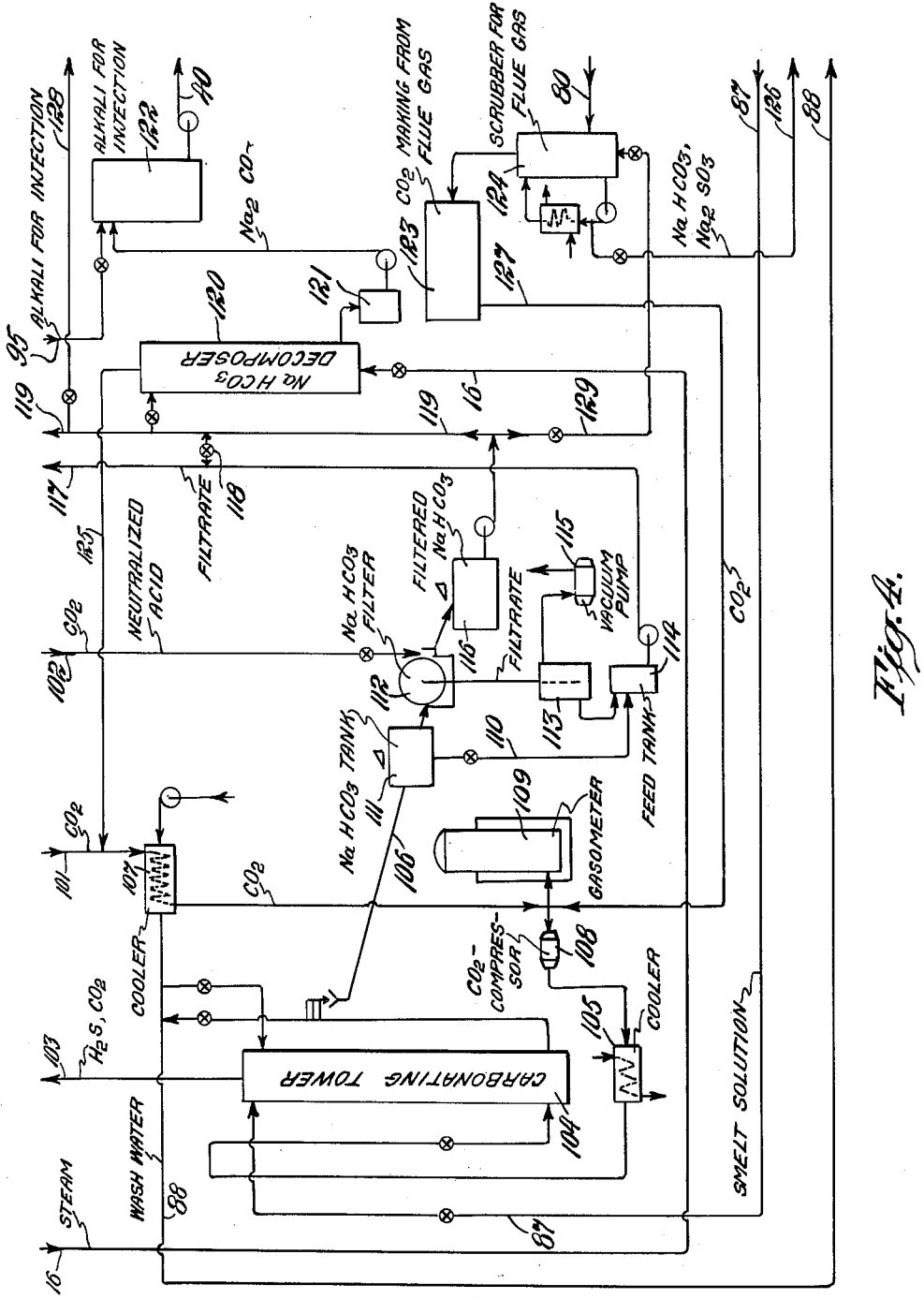

2,730,445
INTEGRATED LIGNOCELLULOSE DIGESTION AND RECOVERY PROCESS

George Sivola, Rauma, Finland

Application March 21, 1952, Serial No. 277,818

11 Claims. (Cl. 92—11)

The present invention relates to the art of producing pulp from cellulose fibrous materials, and, more particularly to an improved multi-stage acid-alkali cooking process using a low acid/wood (fibrous material) ratio of the order of about 3:1 for producing pulp from fibrous materials containing cellulose and for the recovery of heat and chemicals of the residual liquors.

It is well known to those skilled in the art that in the ordinary sulfite process using calcium bisulfite with an excess of sulfurous acid in the cooking liquor an enormous amount of work has been spent on the development of a method for a full and economical recovery of the residual liquor, the so-called "waste-liquor," but no satisfactory solution to the problem has as yet been found. The common practice, therefore, has been to dispose the residual liquor into streams or bodies of water. As is well known, this practice has resulted in serious pollution of the water. The main object of these prior attempts for recovery, apart from the prevention of pollution of the streams and bodies of water, has been connected with the possibility of utilizing the heat value of the organic compounds in the liquor, whereas the calcium content of the liquor possessed only a very small economic value. It is also known that the use of sodium instead of calcium in the cooking liquor, such as sodium sulfite or sodium bisulfite, gives such advantages that the resulting pulp is of a better quality than that obtained by the conventional calcium bisulfite process. Such processes have been used in spite of the fact that the price for sodium is much higher than the price for calcium. In view of this difference in price, very serious efforts have been made to develop a satisfactory recovery system for the re-use of the sodium compounds and the utilization of the organic compounds for the development of heat, etc. Such a prior process is described in the Swedish Patent No. 126,919 and U. S. Patent No. 2,496,550 and is concerned primarily with a recovery system for a cooking process, both of which are entirely different from the present invention.

It is generally known that the main difficulty in connection with all prior efforts for the recovery of sodium compounds from residual liquor results from the fact that in burning the liquors concentrated by evaporation not only sodium carbonate was formed but also considerable amounts of sodium sulfide. The complete conversion of such sodium sulfide into sodium bicarbonate and hydrogen sulfide involved a very difficult task as some unchanged sodium sulfide remained. If the recovered and converted sodium compounds were used for the making of sodium sulfite or sodium bisulfite, some other compounds were also formed such as sodium thiosulfate and sodium polysulfides which caused great difficulties in subsequent cooks even though the amounts of these salts were comparatively small. These difficulties were due mainly to the fact that sodium sulfide, sodium thiosulfate and sodium polysulfides reacted with sulfur dioxide to form free sulfur. In practice, the bad experiences have caused those skilled in the art to suggest that a pulp mill using the sodium sulfite or sodium bisulfite cooking process should be operated in connection with a sulfate pulp mill. In such a case, the unconverted sodium sulfide from the sulfite mill recovery system can be used in the sulfate cooking liquor to increase the sulfidity of the sulfate cooking liquor.

It has been discovered that the foregoing difficulties arising from the conversion of recovered sodium sulfide is overcome by the utilization of the present three-stage cooking process which uses in the first acid stage sodium sulfite or sodium bisulfite made from the fully converted part of the sodium carbonate and sodium sulfide. Such fully converted part can be separated as pure crystals of sodium bicarbonate from the smelt solution which is treated in one continuous operation in a tower with an excess of nearly pure and compressed carbon dioxide gas. The resulting conversion of the sodium sulfide can be completed or only partly completed. When it is only partly completed, the solution containing the sodium sulfide besides the sodium carbonate and sodium bicarbonate is used for the injection in the second stage of my three-stage process to convert the acid cooking solution into an alkaline cooking solution. In this second stage as well as in the third stage of the cooking process, the presence of sodium sulfide does not cause any difficulties or disadvantages as the cooking conditions are alkaline.

It likewise has been found that in the present three-stage cooking process, alkali used for the making of the sodium sulfite or the sodium bisulfite can contain unconverted sodium sulfide from the smelt solution and therefore even the mother liquor from the separation of the sodium bicarbonate crystals can be used for the making of acid cooking liquor for the first stage because in the following stages alkali is injected or present in excess and no difficulties can result from the presence of such unconverted sodium sulfide.

It has also been found that in the present improved process the first stage of cooking is conducted with a liquor containing sodium sulfite or sodium bisulfite or sodium bisulfite with an excess of sulfurous acid and the second stage involves an alkali injection of a carbonate of sodium for converting the cooking liquor from neutral or acid to alkaline without separating the liquor from the pulp and the third stage of the cooking process is conducted with the alkali cooking liquor containing mainly a carbonate of sodium in addition to the sodium and sulfur compounds derived from the previous operations of the cooking whereby the pulp produced is separated from the residual liquor and the liquor is concentrated and burnt in a recovery unit with a furnace and a boiler to generate steam and to produce a smelt and the smelt containing mainly sodium carbonate and sodium sulfide is dissolved and these salts are converted so that they can be re-used in the preceding operations of the process.

It is an object of the present invention to provide a self-supporting cyclic operation of recovering chemicals and heat by substantially complete utilization of residual cooking liquor in a form permitting the re-use of the chemicals and heat for any stage of the novel three-stage process of manufacturing cellulose from fibrous material containing cellulose.

It is also an object of the present invention to convert sodium carbonate occurring in the solution obtained from the smelt into sodium bicarbonate by means of carbon dioxide while at the same time also converting sodium sulfide in the said solution into sodium bicarbonate and gaseous hydrogen sulfide by means of the carbon dioxide.

The present invention likewise contemplates the neutralization of sodium bisulfite, free sulfurous acid and any acid formed during the acid cooking stage in one and the same digester in which the cooking is conducted and which neutralization changes the pH to a value between 7 and 13 whereby substantial economical advantages are gained because the machinery and equipment used for separation, concentration and burning of the residual liquor and solution of the smelt can be made of the same material as used in the conventional soda and sulfate process.

It is likewise within the contemplation of the present invention to recover the carbon dioxide liberated from the digester during the neutralization and the cooking so that it can be used for conversion of sodium carbonates into sodium bicarbonate and sodium sulfide into sodium bicarbonate and hydrogen sulfide, all of which can be re-used in the process.

A further object of the present invention is to re-use the sulfur compounds needed in the cooking which compounds are recovered in two ways, (1) by the recovery of all the free gaseous sulfur dioxide remaining available after the first acid stage of the three-stage cooking process and the use of these gases for the making of the cooking acid and (2) by the recovery of the hydrogen sulfide evolved in the conversion of the sodium sulfide of the smelt solution and the burning of such hydrogen sulfide to sulfur dioxide which also is likewise used for the preparation of cooking acid.

Another object of the present invention is to recover and re-use all the sodium salts used in the novel three-stage cooking process, to wit: mainly for the preparation of the cooking acid containing sodium sulfite or sodium bisulfite needed for the first acid cooking stage and for injection of alkali for the neutralization of the acid cooking liquor involved in the second stage and for the provision of the necessary alkali for the alkaline liquor in the third stage of the cooking process.

A still further object of the present invention is to recover and re-use all the carbon dioxide needed for the conversion of the sodium carbonate and sodium sulfide of the smelt solution and such carbon dioxide is recovered firstly (that is, primarily, principally, or mainly) from the digester when liberated during the neutralization stage and alkali cooking stage, secondly when liberated in the acid making operations where sulfur dioxide reacts with sodium carbonate or sodium bicarbonate, thirdly in other auxiliary operations, such as the conversion of sodium bicarbonate into sodium carbonate by heating, and fourthly from the flue gases containing carbon dioxide.

Other objects and advantages will become apparent from the following description taken in conjunction with the accompanying drawings, in which:

Fig. 4 illustrates a flow sheet depicting the conversion operations involved in the treatment of the smelt solution with carbon dioxide.

Broadly stated, the present invention provides a novel combination of cyclic self-supporting operations for the recovery of chemicals and heat and for the novel three-stage pulp cooking process, in which the first stage is conducted with an acid cooking liquor, the second stage involves an injection whereby the acid liquor is converted into alkaline liquor, and the third stage is conducted with an alkali liquor having a pH from 7 to 13 measured at room temperature.

The present invention may be carried into practice in any appropriate equipment, as those skilled in the art will readily understand. However, it is preferred to use the equipment illustrated in the accompanying drawings.

Figure 1:
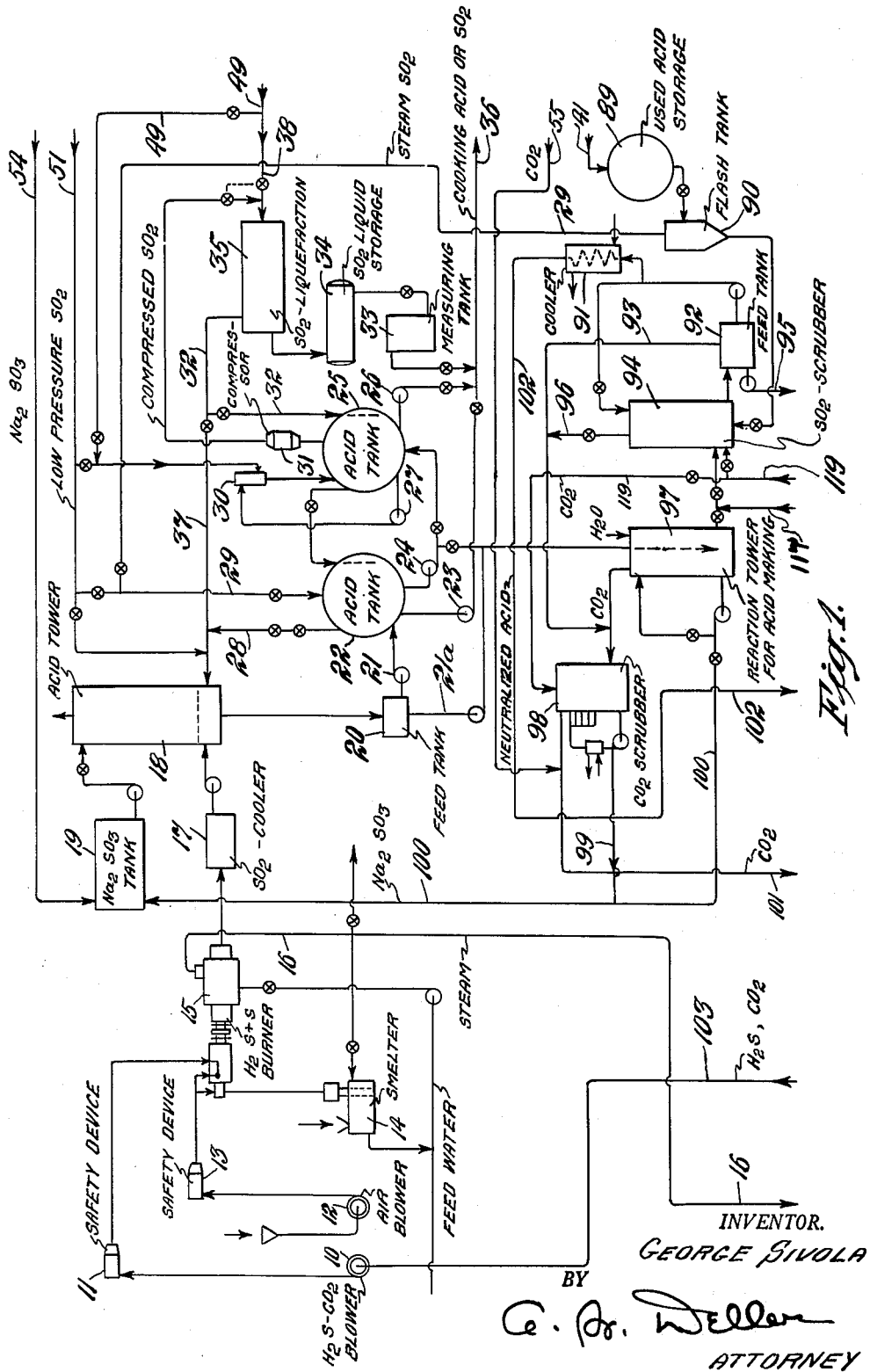
Fig. 1 is a flow sheet of a plant capable of carrying the present invention into practice for the preparation of the cooking acid used in the first of the novel multi-stage cooking process.
Figure 2:
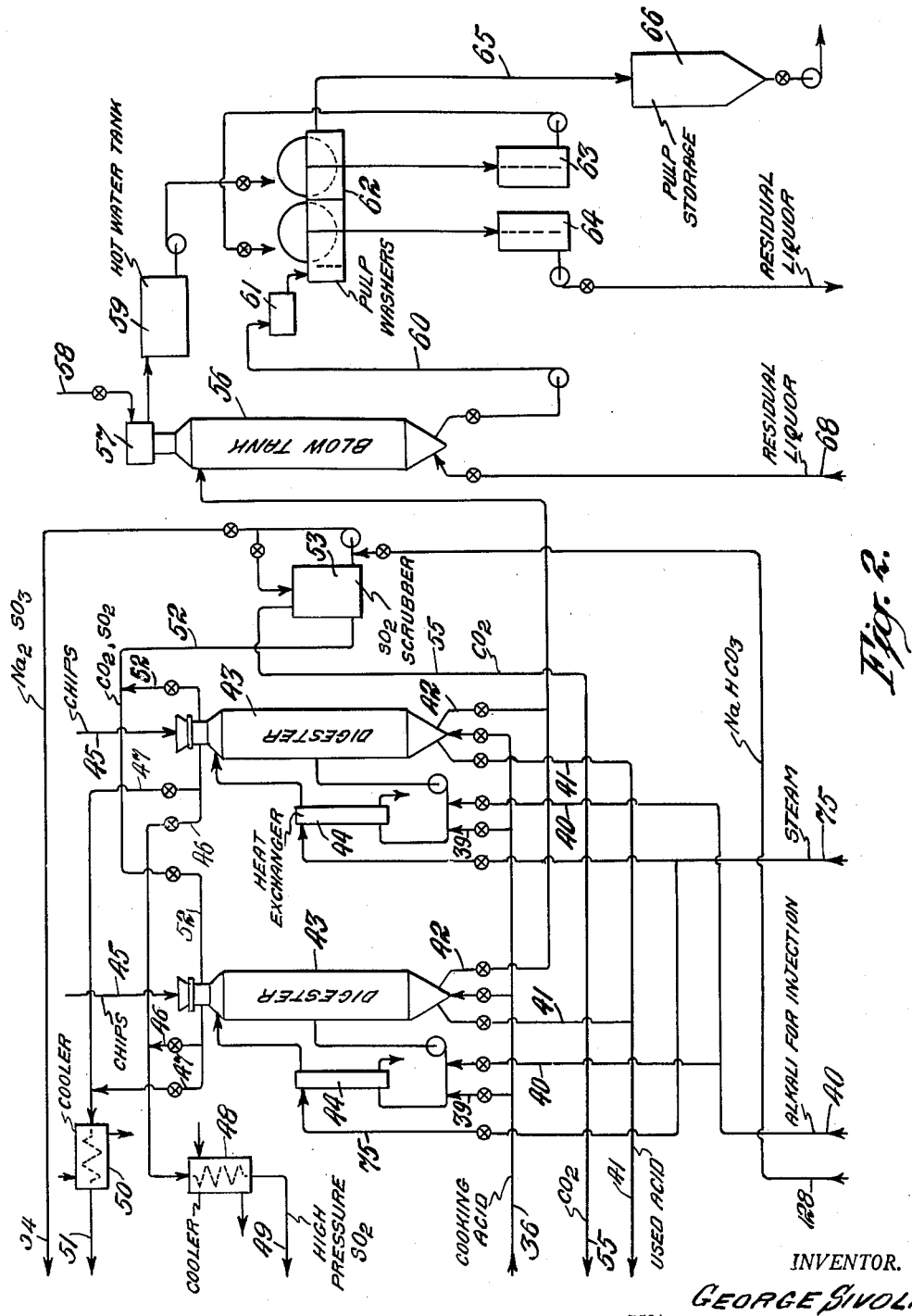
Fig. 2 represents the equipment used in carrying the novel three-stage cooking process embodying the present invention into practice.

In Fig. 1 the reference character 10 designates a gas fan for the mixture of hydrogen sulfide and carbon dioxide gases coming from conversion tower 104 (see Fig. 4) and blowing said gases through a safety device 11 into a combined hydrogen sulfide and sulfur oven or furnace and steam boiler 15. Air blower 12 blows air through a safety device 13 to the burner of the oven or furnace 15 in which burner the air is mixed and burned with the hydrogen sulfide gas as well as with liquid sulfur from melting pot 14. The heat developed by the combustion is used to generate steam which flows through pipe 16 to be used in the process. The gases resulting from the combustion pass through gas cooler 17 into sodium sulfite tower 18 where the $SO_2$ contained in the gases reacts with a solution of sodium sulfite to form sodium bisulfite or sodium bisulfite with an excess of sulfurous acid in case such an excess is desired. In the summer, it is difficult to make an acid with such an excess, and, therefore, the absorption in the tower 18 will be conducted only to the stage of a sodium bisulfite solution. An attempt to make a solution with an excess of $SO_2$ when the water is warm would lead to the result that sulfur dioxide would pass out into the air together with the inert gases going out from the top of the tower. When a solution containing only sodium bisulfite is made from the sodium sulfite solution pumped into the tower 18, the use of this solution differs somewhat from the use of a solution which also contains free $SO_2$ in excess. In Fig. 1, both cases are shown and will be fully explained hereinafter. It was stated hereinabove that a solution of sodium sulfite is pumped to the tower 18 and in both cases this solution comes from the tank 19 and is pumped to the top of the tower 18. From the bottom of the tower 18 the acid in both cases passes to a storage tank 20. When an acid containing sodium bisulfite without an excess of $SO_2$ is made, only that part of the acid which is needed to charge the digesters passes pump 21 into the low pressure acid storage tank 22 to be strengthened further in a manner similar to the operation when an acid with an excess of $SO_2$ comes from the tower 18. The other part of the sodium bisulfite solution is circulated through pump and line 21a into the neutralization tank 97 where it neutralizes a solution of sodium bicarbonate to give sodium sulfite as explained in connection with the operation of the tank 97 hereinafter. When an acid containing an excess of $SO_2$ is made in tower 18, all the acid is pumped from the storage tank 20 by pump 21 to the low pressure acid tank 22. From the tank 22 any acid which has reached it according to both the alternatives mentioned can be transferred by means of the pump 24 to the strong acid tank 25. The acid is pumped from storage tank 25 with pump 26 through line 36 into the bottom of digester 43 (see Fig. 2).

The material to be cooked has been filled into digester 43 and this filling operation is represented by line 45. A modern digester is usually provided with a circulating system with a heat exchanger. The cooking is, for instance, done by means of equipment known to those skilled in the art, by having the cooking liquid circulated through heat exchanger 44 whereby heat is supplied by steam from line 75. In this case, the cooking follows the method embodying the novel three-stage cooking method in which the first stage is the acid stage. During the first part of the acid cooking, the excess $SO_2$ is relieved through line 46 through cooler 48 and further through line 49 to injector 30 into which pump 27 circulates acid from tank 25 in order to develop suction and provide better absorption of the $SO_2$.

After completing the acid stage of the cooking, $SO_2$ is relieved from the digester so that the free $SO_2$ content of the digester becomes as low as possible (1% $SO_2$ or less) and the released gas goes through line 47 (see Fig. 2), cooler 50 and pipe 51 into low pressure acid tank 22 (see Fig. 1). $SO_2$ and other gases not absorbed in tank 22 go from this tank through pipe line 28 into the bottom of the sodium sulfite tower 18 where the $SO_2$ is absorbed, and the inert gases leave at the top of the tower. From the top of high pressure acid storage tank 25, excess gas can pass through a pressure regulator valve into the acid of low pressure acid storage tank 22. This description likewise applies to the operation when the free $SO_2$ is recovered from the digesters in a manner typical for the conventional sulfite method.

Great advantages are secured by using a system of liquefying the recovered $SO_2$ so that liquid $SO_2$ is available for operations which are described hereinafter. The tower acid coming from tower 18 (see Fig. 1) passes through feed tank 20 and is pumped into acid storage tank 22. Pump 23 transfers this acid through line 36 to digester 43 (see Fig. 2) to supply the amount of liquid needed for the acid stage of the cooking of the fibrous raw material. Cooking begins by having the acid circulated through heat exchanger 44 and steam is supplied through line 75 to the heat exchanger 44. After this operation, an injection of liquid $SO_2$ is effected from tank 34 (see Fig. 1) through the measuring tank 33 (see Fig. 1) and pipe line 36 into the digester. The moment of such injection of liquid $SO_2$ might be chosen at will. For instance, it can be applied immediately after the acid has been pumped to the digester, in which case no time has been allowed for the penetration of the sodium bisulfite into the material to be cooked, or it might take place later, as for instance up to 4 hours later, in order to allow time for penetration of the sodium bisulfite into the chips. At the beginning of the cooking the gases, mainly inert gases, are relieved through line 47 and cooler 50 and pipe 51 into tower 18 (see Fig. 1). After the pressure in the digester has increased, for instance, up to 5 atmospheres, gauge pressure, or higher, the $SO_2$ gas in the digester is relieved through line 49 (see Fig. 2), cooler 48 through line 38 (see Fig. 1) into a liquefaction plant 35 which can be arranged according to, for instance, Norwegian Patent No. 73,832 (Somer). Using the method outlined in said patent only about 70% of the $SO_2$ coming from the digester can be liquefied and this liquefied $SO_2$ goes into storage tank 34. The part of the $SO_2$ which leaves the liquefaction plant 35 as a gas is conducted through pipe 32 into the high pressure acid tank 25 where the pressure is at least about 2 atmospheres, gauge pressure. In order to get more $SO_2$ liquefied, the pressure of the free gaseous $SO_2$ in the upper part of the acid tank 25 is raised by relieving a part of the concentrated $SO_2$ from the digester under pressure through the line 49 (see Fig. 2), through the injector 30 (see Fig. 1) into the acid tank 25. The concentrated $SO_2$ gas from the top of the acid tank 25 is compressed by the compressor 31 to the same gas pressure as the gas coming from the digester and joins the pipe 38 to the liquefaction plant 35. By doing this it is possible to liquefy practically all the $SO_2$ gas coming from the digester.

Regardless of whether the conventional system of relief has been used or the system using liquid $SO_2$ described herein has been applied, the further operations involved in the multi-stage cooking take place as follows:

In order to keep the amount of liquid eventually to be evaporated as low as possible, some acid cooking liquid is drawn from the digester at the end of the acid cooking stage through the pipe 41 (see Fig. 2) into the tank 89 (see Fig. 1).

From the tank 122 (see Fig. 4), a solution of sodium salts containing mainly sodium carbonate and sodium bicarbonate is pumped through pipe 40 into the pressure side of the pipe of the circulating pump of the digester. When this injection of alkali is carried out, carbon dioxide is liberated in the digester and the digester is relieved through line 52 (see Fig. 2) which conducts the gas containing mainly $CO_2$ and also some $SO_2$ to a scrubber 53 where $SO_2$ is removed from the gas mixture by a circulating liquid containing sodium bicarbonate. This liquid is circulated in the scrubber 53 until sufficiently rich in sodium sulfite, so that it is possible to use it for the acid making by pumping it to the sodium sulfite tank 19 in order to join other sodium sulfite solutions to be used in the acid making process. Sodium bicarbonate solution used in the scrubber is supplied to the scrubber 53 (see Fig. 2) from sodium bicarbonate tank 116 (see Fig. 4) using the pump and pipe 119 and pipe 128. The nearly pure concentrated carbon dioxide is conveyed from the top of the scrubber 53 (see Fig. 2) through the line 55 (see Fig. 2) to the line 101 (see Fig. 1) and to the cooler 107 (see Fig. 4), through the pipe into the gasometer 109 or direct to the compressor 108.

In case the conversion of the smelt solution as mentioned hereinbefore, has been carried out to completion, there is practically no sodium sulfide in the solution used for the alkali injection into the digester. Therefore, the alkali cooking liquor contains mainly sodium carbonate, some sodium bicarbonate and sodium sulfite apart from the salts formed of organic substances in the digester as well as such organic substances which do not combine with alkali. On the other hand, in the case that the conversion of the smelt has not been carried out to completion, there might also be present in the injection liquor some sodium sulfide which in the digester reacts with free $SO_2$ forming sodium thiosulfate and under certain conditions also sodium polysulfides. However, as the cooking now is carried out with alkali, there is no danger of formation of free sulfur in the cooking liquor and the sodium thiosulfate or sodium polysulfides can do no harm to the cooking operations.

Figure 3:
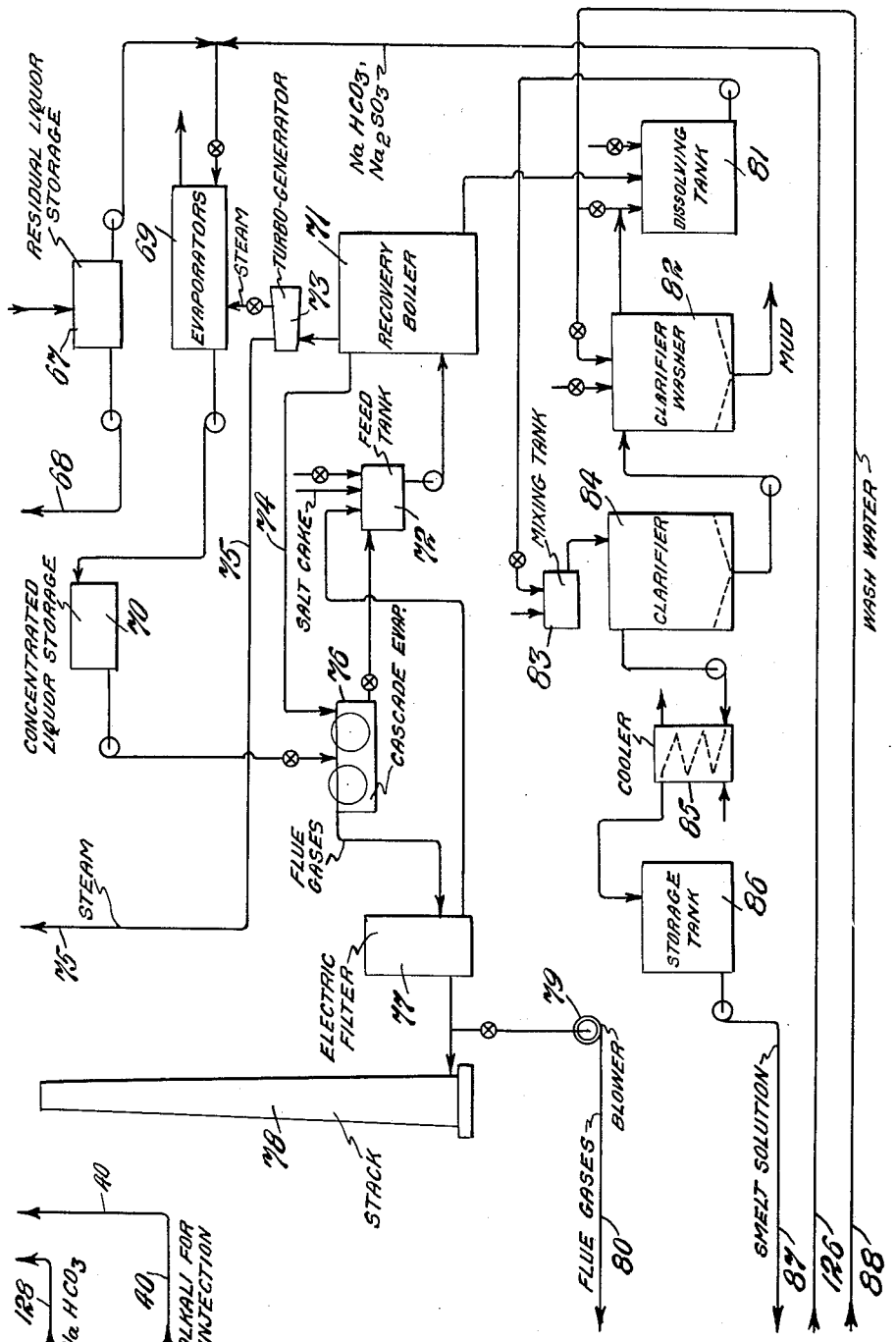
Fig. 3 illustrates a flow sheet of the novel combination of operations involved in the treatment of the residual liquors, to wit: their evaporation, burning and dissolution of the smelt as well as auxiliary operations.

After the completion of the alkali stage of the cooking, the content of the digester is blown into the blow tank 56 (see Fig. 2) from where the mixture of pulp and liquor is pumped through pipe 60 and regulator 61 to the pulp washers 62 where the residual liquor is separated from the pulp and the strong liquor recovered goes to storage tank 67 (see Fig. 3). A part of this strong separated liquor is pumped through line 68 into the blow tank 56 to convey the pulp from the blow tank to the pulp washers 62. The washed pulp from the washers goes through pipe 65 to the pulp chest 66 from where it can be taken to other places in the pulp mill for handling and treatment.

From the tank 67 (see Fig. 3), the residual liquor is pumped to the evaporators 69 where it is evaporated so far that the dry substance content of the concentrated liquor being pumped from the evaporators to a storage tank 70 is from about 50 to about 55%. From the tank 70 the concentrated liquor goes to a cascade evaporator 76, where the flue gases coming from a recovery boiler 71 through duct 74 evaporate the concentrated liquid from storage tank 70 further so that the dry substance content of the liquor going into a feed tank 72 is from about 60 to about 70%. Into feed tank 72, salt cake or some other cheap sodium sulfur compound is added to cover the alkali losses during the cyclic operation. From feed tank 72, the strong liquor goes to recovery furnace 71 where it is burnt under reducing conditions to form a smelt containing mainly sodium carbonate and sodium sulfide and runs out from the furnace to a smelt dissolving tank 81. While burning, the organic matter develops heat in furnace 71 which is used to generate steam and this steam goes first to the steam turbo-generator 73 having several bleeds for different pressures of steam to be used in the process, such as cooking pipe line 75 (see Figs. 2 and 3). The amount of steam developed is so large that it is sufficient for all the power and steam requirements of the improved process.

The residual liquor is boiled in the evaporators 69 and steam is formed from the water of the residual liquor. After passing through the evaporator units, the steam is condensed and it is called secondary condensate. The condensate has a slight but not unpleasant odor and it is a little turbid, particularly the condensate coming from the first two or three evaporator units. The pH-value, measured at room temperature, is from 4.5 to 5.0. The condensate 69a cannot be used, without being first purified as, for instance, boiler feed water. Therefore, it must be purified before being used. The purification of the condensate is not a difficult task. It can be done as follows: 30 to 60 grams/m.$^3$ NaOH and 20 to 30 grams/m.$^3$ alum is added to the condensate and then mixed. 1 to 3 hour reaction time is allowed and then it is filtered through a sand filter. The condensate can be purified by filtering it through a charcoal filter. Activated silica gel is also a good filtering medium. By treating the condensate this way it can be used as shower water on the drying machine, particularly when making high-grade pulps because the condensate is practically mineral free. Of course, it can also be used in bleaching operations where pure mineral free water is needed.

The flue gases going through cascade evaporator 76 pass through pipe into an electric filter or precipitator 77, where the sodium salts and dust carried by the flue gases are precipitated and conveyed to the feed tank 72 to be re-used. The main part of the flue gases continue to stack 78 and a part of the flue gases containing $CO_2$ is blown by fan 79 through pipe 80 into scrubber 124 (see Fig. 4).

In dissolving tank 81 (see Fig. 3), the smelt is dissolved in alkali wash water coming from the wash tank 82 or the dissolving water might be alkali wash water from the washing of conversion tower 104 (see Fig. 4), from which it comes to dissolving tank 81 or wash tank 82 through pipe 88, or fresh water might be used. The solution in the dissolving tank is made so that it contains about 150 grams $Na_2O$ per liter, which is the highest content of alkali which can be safely used. The smelt solution is pumped from tank 81 to mixing tank 83 into which magnesium salts may be added in a known way and in which mixing is carried out. From tank 83, the smelt solution is run to clarifier 84 where the dissolved smelt is clarified and the calcium, iron and silicon compounds derived from the wood during the cooking are removed by the sludge going out through the bottom of the clarifier and pumped to washer-clarifier 82 where the sludge is washed free of sodium compounds and from where the wash water goes into dissolving tank 81. Wash water used to wash the sludge from the smelt can be the same water that is used to remove sodium bicarbonate crusts from the conversion tower 104 (see Fig. 4). The sludge from the bottom of washing tank 82 is disposed of to the sewer.

The clarified liquor from clarifier 84 is pumped through a heat exchanger 85 where it is cooled down to about 35 to about 40° C., after which it goes to a storage tank 86.

As described hereinbefore, at the end of the acid cooking some of the acid cooking liquor was bled through pipe 41 (see Fig. 1) into the tank 89 (see Fig. 1). From this tank, a required or selected amount goes into expansion vessel 90 where the hot liquor is allowed to expand so that steam and $SO_2$ are removed as flash and are conducted through line 29, for instance, to acid tank 22 to heat up the acid and to absorb $SO_2$. The liquor from the bottom of the expansion vessel 90 goes into neutralization vessel 94 in which the sodium bicarbonate used for the neutralization comes either from the sodium bicarbonate tank 116 (see Fig. 4) by means of pump and line 119 or from the sodium bicarbonate tank 111 by means of pipe 110 and pump feed tank 114. The filtrate from the sodium bicarbonate filter 112 goes into tank 114 via tank 113. From feed tank 114, the sodium bicarbonate solution is pumped through line 117 to the neutralization tank 94 (see Fig. 1).

Carbon dioxide evolved in tank 94 (see Fig. 1) is let out through pipe 96 and passes to scrubber 98 where $SO_2$ is removed from the $CO_2$. Thereafter, the $CO_2$ passes through line 101 and cooler 107 (see Fig. 4) to gasometer 109 or direct to the compressor 108. The alkali used to remove $SO_2$ from the gas in the scrubber 98 (see Fig. 1) comes through the pipe 119 from the bicarbonate tank 116. Enriched wash solution from the scrubber 98 (see Fig. 1) is pumped through line 99 and 100 to sodium sulfite tank 19. The neutralized acid from the neutralization tank 94 goes to the tank 92 from which a part of the solution is recirculated back to the tank 94 to kill foam. There is a branch off from the circulation pump in which line also is a cooler 91 which cools the neutralized acid to between about 30 and about 40° C. Thereafter the neutralized and cooled acid goes through line 102 (see Figs. 1 and 4) into the trough of the sodium bicarbonate filter 112 to convey the separated sodium bicarbonate crystals into sodium bicarbonate tank 116. The rest of the neutralized acid is pumped through line 95 (see Figs. 1 and 4) to the alkali for injection tank 122 (see Fig. 4).

For the making of sodium sulfite, a solution of sodium bicarbonate can be taken either from the pump feed tank for filtrate 114 through pipe 117 to the reaction tank 97 (see Fig. 1) or from the dissolving tank 116 for crystallized sodium bicarbonate with the pump and pipe 119, pipe 118 and pipe 117 (see Figs. 1 and 4) to the reaction tank 97 (see Fig. 1) just mentioned. There are no chemical disadvantages involved in the use of this filtrate although it has been proven that the sulfur of sodium thiosulfate in the cooking acid can be as high as 10% of the total sulfur present without causing any trouble when the acid cooking is followed by alkaline cooking. However, there is a great advantage in using the filtrates to make new cooking acid because in that case the amount of water to be evaporated after the cooking is just as much reduced as the volume of filtrate used in the acid plant amounts to. As explained in connection with the description of acid making in the sodium sulfite tower 18, there are two alternatives of operation. Either there was made an acid containing sodium bisulfite or a mixture of sodium bisulfite and sodium sulfite or an acid containing sodium bisulfite with an excess of $SO_2$. In the case that an acid containing only sodium bisulfite or a mixture of sodium bisulfite and sodium sulfite is made in the tower 18, a part of this acid is taken from the storage 20 by means of pump and line 21a to the reaction tank 97 to react with the sodium bicarbonate or sodium carbonate. Due to the reaction, carbon dioxide is evolved, and, as the escaping gas contains some $SO_2$, it is conducted from the reaction tank 97 through a pipe to scrubber 98 and then nearly pure carbon dioxide goes through line 101 (see Figs. 1 and 4) and heat exchanger 107 (see Fig. 4) to the gasometer 109 or to the compressor 108.

The other alternative operation is as follows: When an acid containing sodium bisulfite with an excess of $SO_2$ has been made in the tower 18, all the acid has reached the low pressure storage tank 22 and from there possibly also the high pressure storage tank 25. This operation has already been explained. From the acid storage tanks, either storage 22 or 25 (see Fig. 1), acid is taken to reaction tank 97 to react with sodium bicarbonate or sodium carbonate. Due to the reaction, carbon dioxide is evolved whereby the escaping gas contains some $SO_2$ and passes from reaction tank 97 through the pipe to scrubber 98 and then nearly pure carbon dioxide goes through the line 101 (see Figs. 1 and 4) and heat exchanger 107 (see Fig. 4) to the gasometer 109 or the compressor 108. From the reaction tank 97, the sodium sulfite solution is pumped into tank 19 (see Fig. 1) through pipes 99 and 100.

The clarified and cooled liquor from tank 86 (see Fig. 3) containing alkaline sodium salts, such as 150 grams of $Na_2O$ per liter, is pumped through line 87 to the top of conversion tower 104 (see Fig. 4), which is similar to the carbonating towers used in the Solvay soda process and consists of a number of "mushrooms" and division plates or "passettes," one above the other, and the necessary indirect cooling systems. The liquor descends continuously in a well-distributed manner through the tower while it meets a cooled current of nearly pure carbon dioxide gas supplied at a pressure of about 3 kg./cm. and by compressor 108 connected to the bottom of the tower. The carbon dioxide gas comes to the compressor either from gasometer 109 or direct from the CO₂ sources of the process. In the tower, the following reactions take place:

$$Na_2S + H_2O = NaOH + NaHS$$
$$2NaOH + CO_2 = Na_2CO_3 + H_2O$$
$$NaHS + CO_2 + H_2O = NaHCO_3 + H_2S$$
$$Na_2CO_3 + CO_2 + H_2O = 2NaHCO_3$$

In order to obtain a complete conversion, an excess of CO₂ must be used. The gas leaving at the top of the tower through the pipe 103 to the H₂S burner therefore contains not only H₂S but also CO₂. The reactions in the conversion tower are exothermic and therefore the temperature in the tower would rise unless controlled by cooling. A temperature of about 30° C. is sought for the liquor leaving through the draw opening at the bottom and up through the vertical pipe for the draw and reaching the discharge point at the funnel which feeds the line 106 to the sodium bicarbonate tank 111 equipped with an agitator. From this tank, the solution containing crystals of sodium bicarbonate reaches filter 112 where the crystals are separated from the mother liquor. After this operation, the crystals are flushed with neutralized acid coming through pipe 102 so that they flow into tank 116 provided with an agitator. Water can also be used for this purpose. The mother liquor from the filter goes through the pipe into a suction tank 113 in which a vacuum is kept by vacuum pump 115. From suction tank 113, the mother liquor goes into a pump feed tank 114.

In order to have less CO₂ evolved in the digester, sodium bicarbonate from tank 116 is pumped through pipe 119 to the top of sodium bicarbonate decomposer 120. This decomposer is a packed tower provided with means for indirect or direct heating. When the solution trickles down through the tower, heat is supplied to the bottom of the tower, such as by an indirect heating element built in the tower itself, in which the heating is done by steam coming through pipe 16. In the heated solution in the tower, the sodium bicarbonate is decomposed so that carbon dioxide is evolved and passes through pipe 125 and cooler 107 into the gasometer 109 or the CO₂ compressor 108. The solution containing mainly sodium carbonate leaves via the bottom of the decomposer to a feed tank 121 from where a pump forces it to storage tank 122 for sodium carbonate to be used for neutralization in the digester. In case it is desired to decompose the filtrate or the mother liquor from the bicarbonate filter 112, this operation can also be carried out in decomposer 120 to which the necessary pipe lines lead through connection 118.

In case the quantity of CO₂ available from all the sources described hereinbefore prove insufficient, additional amount of CO₂, required for the conversion of the smelt solution can be obtained from the flue gases coming from the electric precipitator 77 (see Fig. 3). There are a number of known ways developed for this purpose whereby nearly pure CO₂ can be isolated from flue gases, such as: the "Alkazid" process, the potassium carbonate method or the high pressure water method, as those skilled in the art know. Using any of the known methods, the flue gases must first be scrubbed or purified so that they are free from SO₂. In order to do this, the flue gases after leaving the electric precipitator 77 are blown with a fan 79 through line 80 (see Figs. 3 and 4) into scrubber 124 (see Fig. 4), in which sodium bicarbonate solution is circulated by means of a pump drawing solution from the bottom of the scrubber and discharging it into the top of the scrubber. Sodium bicarbonate solution is taken from the sodium bicarbonate tank 116 (see Fig. 4) through pipe 129. The circulating solution becomes enriched with SO₂ in the scrubber and as some soot which is carried over with the flue gases also might enter into it, it is best to pump it through pipe 126 (see Figs. 4 and 3) to the evaporators 69 (see Fig. 3) where it mixes with the residual liquor from the digesters entering the evaporators. From the top of the scrubber, the scrubbed gas goes into a CO₂ concentration plant 123 (see Fig. 4) from where it goes through pipe 127 into gasometer 109 or directly to compressor 108.

In pulp mills, as those skilled in the art know, pulp is often bleached with a well-known treatment with caustic soda, such as an intermediate stage in the bleaching process, which gives great advantages but which requires caustic soda in such an operation. In the present process, sodium bicarbonate is available either in form of pure crystals or in form of a solution after the conversion of the smelt with carbon dioxide. From such sodium bicarbonate, it is also possible to obtain sodium carbonate after the decomposer where all of the carbon dioxide is recovered. This sodium carbonate can be causticized with lime in a well-known way and the solution is strong enough to be used in the bleaching process. It is evident from the description of the present recovery system that the ultimate raw material for the making of sodium carbonate consists of the salt cake added to the system via the feed tank of the furnace. This way of preparing the caustic alkali for the bleaching process gives an economical advantage, as those skilled in the art will readily appreciate.

In many localities where pulp mills are operated, sodium carbonate and/or caustic soda are available at very cheap prices so that it is more economical to use them in place of salt cake. When it is desired to use these chemicals to cover the alkali losses of the present process, they can be used either in the acid making process, where sodium sulfite or sodium bisulfite is made from carbonates of sodium, for which purpose caustic soda also can be applied as an alternative or they can be used for the alkali injection comprising the neutralization stage of the improved cooking process.

The present invention is an improvement of my process for the production of pulp disclosed in my co-pending application Serial No. 784,322, now Patent No. 2,701,763. The detail figures, such as temperatures, pH's, concentrations, weights and volumes, etc., as well as the illustrative examples can be used herein and are incorporated herein by reference. In my prior application Serial No. 784,322, I have described a three-stage cooking process for producing pulp from fibrous materials containing cellulose and shown that this process results in the production of a superior and improved pulp containing fibers which have desired chemical characteristics, such as high alpha content and which have strength characteristics just as good or better than conventional sulfate pulp, and that this process has self-supporting cyclic systems for recovery of chemicals and heat.

It is to be observed that the improvements over my invention disclosed in my co-pending application include the following:

(1) Na₂SO₃ solution is used to chemically take up all the SO₂ produced by burning of H₂S and sulfur.

(2) The filtrate from the NaHCO₃ separator is used for acid making in place of separated and washed NaHCO₃ crystals from the conversion of Na₂CO₃ and Na₂S of the dissolved smelt solution.

(3) At the end of the acid-cooking stage some of the acid cooking liquor is drawn from the digester and is used for transportation and dissolving of NaHCO₃ crystals from the separator or filter of the conversion operation.

(4) A better control of the temperature regulation of CO₂ used for the conversion of the dissolved smelt as well as the temperature regulation of the conversion towers (CO₂-towers).

(5) The use of compressed CO₂ for the conversion of Na₂OCO₃ and Na₂S of the dissolved smelt solution instead of uncompressed gas.

(6) NaHCO₃ is decomposed before it is employed for the alkali injection at the end of the acid cooking stage.

(7) Secondary condensate, which is the evaporated water from the evaporation of the residual liquor, is used.

(8) SO₂, SO₃ and alkali compounds recovered from the CO₂ making from the flue gases are re-used.

(9) NaOH is made from Na₂SO₄ and silica and other impurities are removed from the system in the same operation.

(10) Liquid SO₂ is made and used in the process.

Those skilled in the art will appreciate that the foregoing improvements are unobvious, particularly in view of the following description:

(1) In the new recovery process all the residual liquor is evaporated for the recovery of heat and chemicals and therefore it is important for economical reasons to keep the amount of water to be evaporated as low as possible. In other words, the ratio of the cooking liquor to the wood is as small as possible. In the conventional sulfate process, the aforesaid ratio can be as small as 3.2 to 1. This is possible because the chemicals used in the process are very soluble whereas in the present process, in which free SO₂ has to be taken up by the acid, such a low ratio is impossible to reach, particularly if the gas contains a low percentage of SO₂ and if the temperature of the mill-water is high. In my original invention, it is difficult to keep the ratio of acid to wood sufficiently small and in practice it is found to be high, such as for instance 4 to 1 or 4.5 to 1. The present improvement provides for a small or low ratio, such as 3.2 to 1 or lower, if desired. In the present specification and claims, this small or low ratio will be considered as of the order of 3 to 1 or an acid/wood ratio of about 3 to 1. Such a small or low ratio can be obtained when the operation is carried out in the following way:

The filtrate from the bicarbonate filter 112 reacts with the NaHSO₃ in the reaction vessel 97 forming Na₂SO₃ and evolving CO₂. Na₂SO₃ is then pumped to the top of the acid tower 18 where it reacts with SO₂ coming from the "H₂S-and-sulphur" burner and NaHSO₃ is formed. One-half of the NaHSO₃ coming from the acid tower goes into the acid tank 22 and the other half goes back to the reaction vessel 97. In this way, the ratio of cooking liquor to wood can be regulated at will. To illustrate this statement, the following two examples are given:

*Table for 100 tons of wood*

| I | Tons | II | Tons |
|---|---|---|---|
| 1. Na₂O (45 kg./ton of wood) | 4.5 | 1. Na₂O | 4.5 |
| 2. SO₂ to be combined with the Na₂O | 4.66 | 2. Combined with SO₂ | 4.66 |
| 3. Solution containing sodium bicarbonate | 120.00 | 3. Solution containing sodium bicarbonate | 120.00 |
| 4. Acid for neutralization: | | 4. Acid for neutralization: | |
| 5% SO₂ which can react | 4.66 | 3% SO₂ which can react | 4.66 |
| 1% SO₂ combined | 0.94 | 3% SO₂ combined | 4.66 |
| 6% Total SO₂ | 5.60 | 6% Total SO₂ | 9.32 |
| 5. Total weight of such acid needed | 93.2 | 5. Total weight of acid needed | 155.00 |
| 6. CO₂ released in neutralization | 6.4 | 6. CO₂ released in neutralization | 6.4 |
| 7. Total weight of Na₂SO₃ solution formed | 206.8 | 7. Total weight of Na₂SO₃ solution formed | 268.6 |
| 8. Weight of the water in the Na₂SO₃ solution | 195.8 | 8. Weight of the solution from the tower containing NaHSO₃ | 277.9 |
| 9. H₂S for burning | 4.97 | 9. H₂S for burning | 4.97 |
| 10. Weight of SO₂ formed by burning H₂S (5% by volume) | 9.32 | 10. Weight of SO₂ formed by burning H₂S (8% by volume) | 9.32 |
| 11. SO₂ which is not needed to form 2 NaHSO₃ from the Na₂SO₃ (9.32−5.60) | 3.72 | 11. Weight of the water in the NaHSO₃ solution | 247.5 |
| 12. Temperature of water °C | 20 | 12. Ratio of water to wood | 2.48 |
| 13. Water needed to dissolve 3.72 tons of SO₂ at 20° C | 240.0 | | |
| 14. Total quantity of water (240+195.8) | 435.8 | | |
| 15. Ratio of water to wood | 4.36 | | |

In the foregoing table, a comparison is made between (I), a case when a given quantity of sodium bicarbonate solution is neutralized with strong acid in order to obtain a solution of sodium sulfite for the absorption tower 18 in which excess SO₂ must be absorbed as free SO₂, and (II), a case when the same given quantity of sodium bicarbonate solution is neutralized with tower acid containing only sodium bisulfite in order to obtain the solution of sodium sulfite for the absorption tower 18 in which all of the SO₂ from the burner is taken up so that sodium sulfite is changed into sodium bisulfite.

(I-1) Na₂O. In practical work the quantity of sodium salts needed has been such that 45 kg. of Na₂O has been used per ton of wood. Per 100 tons of wood the quantity needed is therefore 4.5 tons.

(I-2) Na₂O+SO₂=Na₂SO₃. Consequently, according to molecular weights 4.5 tons of Na₂O combines with $$\frac{64}{62} \times 4.5 = 4.66 \text{ tons of SO}_2$$

(I-3) The weight of sodium bicarbonate solution according to estimates will be of the order of 120 tons per 100 tons of wood, and this is the given quantity which is assumed the same for both cases.

(I-4) The composition of the strong acid taken for the neutralization is a matter of experience. An acid with 5% free and 1% combined SO₂ is very usual in the sulfite industry.

(I-5) The total weight of such acid needed for neutralization of the sodium carbonate solution containing 4.5 tons of Na₂O must contain 4.66 tons of SO₂ which can react. An acid which contains 5% of such free SO₂ is used, and therefore 5 tons of free SO₂ are contained in 100 tons of acid and 4.66 tons are contained in (4.66×100)/5=93.2 tons.

(I-6) 2NaHCO₃+SO₂=Na₂SO₃+2CO₂+H₂O
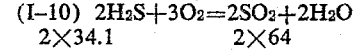

The quantity of CO₂ released is (88×4.66)/64=6.4 tons.

(I-7) The total weight of sodium bicarbonate solution (item 1–3) 120 plus the total weight of acid needed for neutralization (item I-5) 93.2 minus the weight of the CO₂ released (item I-6) 6.4. Result 206.8.

(I-8) The resulting solution of Na₂SO₃ contains the 4.5 tons of Na₂O which were present in the sodium bicarbonate solution plus all the SO₂ of the acid (i. e. 5.6 tons) plus the Na₂O which was combined in the acid (i. e. (62×0.94)/64=0.91 ton), a total of 11.01 tons. The total weight of Na₂SO₃ solution (206.8) minus the weight of all Na₂SO₃ (11.01) gives 195.8 as the weight of water of the Na₂SO₃ solution.

(I-9) The quantity of H₂S for burning is an estimate, and the same figure is used for both cases in the comparison (i. e. 4.97 tons).

(I-10) 2H₂S+3O₂=2SO₂+2H₂O
2×34.1    2×64
(4.97×64)/34.1=9.32

(I-11) There is a total of 5.6 tons of SO₂ in the resulting solution of Na₂SO₃ (see I-8 explanation above) and when this Na₂SO₃ meets burner gas SO₂ in the tower, it takes up the same quantity of SO₂ when the sodium sulfite changes to sodium bisulfite. There is then 2×5.6 tons=11.2 tons of SO₂ in 206.8 tons (item I-7) plus 5.6 tons (weight of the SO₂ taken up from the burner gas to form bisulfite)=212.4 tons of bisulfite acid. The percentage of SO₂ is then $$(11.2 \times 100)/212.4 = 5.28\%$$

There is now 9.32−5.60=3.72 tons of SO₂ which must be dissolved as free SO₂ giving a solution containing 11.2+3.72=14.92 tons of SO₂ in 212.4+3.72=216.12 tons of solution. This is a total SO₂ content of $$(14.92 \times 100)/216.12 = 6.9\%$$

and one cannot expect that all this SO₂ will go into solution, when the burner gas contains only 8% of $SO_2$ by volume, especially not in the summer. The so-called combined corresponds to $5.28/2 = 2.64\%$ of $SO_2$. There has been published in the Paper Trade Journal, July 22, 1937, page 37, certain tables and diagrams and by the use of these, one can see how much total $SO_2$ will be dissolved, at various temperatures in solutions containing 0, 1, 2, 3, 4, 5, and 6% of combined $SO_2$. In the present case, the burner gas contains only 8% of $SO_2$ and the partial pressure of $SO_2$ is therefore only $$760 \text{ mm.} \times \frac{8}{100} = 61 \text{ mm.}$$

It appears that no more than 6.1% of total $SO_2$ can be dissolved when the combined $SO_2$ is 2.64%. The percentage of really free $SO_2$ in excess over bisulfite is then $6.1 - 5.28 = 0.82$ gram of $SO_2$ per 100 grams of water at a temperature of 20° C.

(I-12) The assumption is made that the water has a temperature of 20° C.

(I-13) In the explanation of item I-11, it is found that the acid can take up only about 0.8% of free $SO_2$. The weight of water in this acid was calculated in item I-8 as 195.8 tons and this takes up $$(195.8 \times 0.8)/100 = 1.57$$

tons of $SO_2$. In item I-11, it was found that 3.72 tons must be dissolved as free $SO_2$. There is then $$3.72 - 1.57 = 2.15$$

tons of $SO_2$ which will pass out from the tower unless water is added. The amount of water needed is calculated as follows. A table shows that 100 grams of water can dissolve 11.2 grams of $SO_2$ at 20° C. and a pressure of 760 mm. A gas of 8% $SO_2$ content gives a maximum partial pressure at the bottom of the tower of only 8% of the pressure of a 100% $SO_2$ gas, and therefore according to Henry's law only $$(8 \times 11.2)/100 = 0.9$$

gram of $SO_2$ will be dissolved in 100 grams of water. Consequently, 2.15 tons of $SO_2$ require $$(100 \times 2.15)/0.9 = 240$$

tons of water.

(I-14) The weight of the water in the acid (Item I-8) was 195.8 tons. The total water is then $$195.8 + 240 = 435.8 \text{ tons}$$

(I-15) 435.8 tons per 100 tons of wood is a ratio of approximately 4.36:1 of liquid to wood.

In the second case, the following are comparative points:

(II-1) $Na_2O$ the same given quantity of sodium oxide as in the case I for comparison.
(II-2) Computed as in case I-2.
(II-3) Assumption as in case I-3. A given quantity.
(II-4) The acid for neutralization must contain 4.66 tons of $SO_2$ which is free to react, and as a solution of sodium bisulfite is used, the quantities of $SO_2$ are as enumerated. An acid with 3% of free as well as combined $SO_2$ has been chosen as typical for the case.
(II-5) An acid with 3 tons of free $SO_2$ weighs 100 tons, then an acid with 4.66 tons of free $SO_2$ weighs $(100 \times 4.66)/3 = 155$ tons.
(II-6) The $CO_2$ released computed as in case I-6.
(II-7) Weight of the solution of sodium bicarbonate _____ 120
plus the weight of the solution of sodium bisulfite used for neutralization_____ 155
                                                        ———
                                                        275.0T.
minus the $CO_2$ evolved_____  6.4
                                                        ———
                                                        268.6T.

(II-8) In the tower this solution absorbs all the $SO_2$ gas from the burner (item II-10) i. e. 9.32.

$$268.6 + 9.32 = 277.92 \text{ tons}$$

(II-9) As for case I-9.
(II-10) As for case I-10.
(II-11) The sodium bisulfite solution from the tower contains 9.32 tons of $SO_2$ from the burner and just as much $SO_2$ from the $Na_2SO_3$ solution, i. e. 18.64 tons in all. This is combined with sodium as sodium bisulfite. $SO_2$ has a molecular weight = 64 whereas sodium bisulfite has a molecular weight = 104.

$$(18.64 \times 104)/64 = 30.4 \text{ tons of } NaHSO_3$$

Item II-8, i. e. $277.92 - 30.4 = 247.52$ tons of water.
(II-12) 247.52 tons of water per 100 tons of wood represent a ratio liquid to wood of approximately 2.48:1.

The aforesaid examples show what the ratio of acid to wood can be when the moisture content of wood is neglected. In the first case, it is 4.36 to 1 whereas in the second case, the ratio can be as low as 2.48 to 1 which is lower than any practical commercial or industrial ratio. When taking the ratio 3.2 to 1 versus 4.4 to 1, there is a difference in amount of 1.2 cubic meters of water per ton of wood to be evaporated. When, for example, 2.1 tons of bone dry wood is used to make a ton of pulp, then there is $2.1 \times 2.5$ cubic meters less of water to be evaporated or 0.5 to 0.6 ton of steam (35 kg./cm.$^2$, 750° C.) can be saved.

(2) It is stated in my co-pending application on my original invention that for the acid making only the separated and washed $NaHCO_3$ crystals can be used. It has been found that the cooking acid can also be made from the filtrate coming from the $NaHCO_3$ filter 112. In order to prove this discovery to be correct, a long series of cookings were made. Generally, it is believed that $Na_2S_2O_3$ causes all kinds of troubles in the sulfite cooking and therefore the cooking acid is recommended to be made of pure $NaHCO_3$. When making acid of the filtrate, there might be some $Na_2S_2O_3$ left in the filtrate coming in the smelt solution and also some unconverted $Na_2S$ which forms with $SO_2$, $Na_2S_2O_3$ (sodium thiosulfate), or polysulfides. The trial test cooks were made with an acid which contained so much $Na_2S_2O_3$ that the sulfur content of the $Na_2S_2O_3$ was up to about 20% of the total sulfur content of liquor used for cooking ($NaHSO_3+SO_2+Na_2S_2O_3$). The amount sulfur as $Na_2S_2O_3$ was found to be the maximum which did not cause any noticeable difference in the cooking operation or in the quality of the pulp. This is due to the fact that the acid cooking is followed by the alkali cooking. The fact that the filtrate can be used for the acid making is an important factor as the amount of water to be evaporated will be smaller. When making paper pulp, the amount of water to be evaporated is 2.5 cubic meters smaller and when making high alpha pulp, 2.8 cubic meters smaller. This means a saving of steam (35 kg./cm.$^2$, 750° C.), of about 0.5 to 0.7 ton per ton of pulp.

(3) It has been proven that at the end of the acid cooking stage, 2 to 3 cubic meters of the cooking liquor can be drawn out of the digesters 43 into the tank 89. From there, it goes into the flash tank 90 where it is allowed to flash, and then it goes into the neutralizer 94 where it is neutralized. Thereafter, it can be used for transportation and dissolving of $NaHCO_3$ crystals coming from the filter 112. No separation of lignin takes place out of the acid liquid. By doing this, quite a saving is accomplished as the amount of water to be evaporated is smaller, due to the fact that no extra water is need for dissolving of $NaHCO_3$. The saving of steam (35 kg./cm.$^2$, 750° C.) is about 0.4 to 0.6 ton per ton of pulp.

(4) A good functioning of the conversion towers (CO₂-towers) depends very much on the temperature of $CO_2$ and of the solution of the dissolved smelt. Therefore, it is of advantage to regulate the temperature of $CO_2$ and of the smelt solution. For this purpose, the $CO_2$ being used in the tower is cooled to a selected or desired temperature and the smelt solution in the towers is kept at such a temperature by using heat exchangers built in the towers.

(5) It is also of advantage to use concentrated $CO_2$ and compressed gas as the amount of $CO_2$ dissolved is proportional to the partial pressure of $CO_2$ gas in contact with the solution. In order to accomplish this fact, $CO_2$ and gas before going into the towers are compressed to about 3 kg./cm.² gauge pressure and then cooled.

(6) It has been proven to be very advantageous to decompose the $NaHCO_3$ which is used for the alkali injection before the injection in a separate apparatus. Thus, the time used for the injection is shortened and the liberation of $CO_2$ takes place more evenly as the decomposition of $2NaHCO_3$ to $Na_2CO_3 + CO_2 + H_2O$ is continuous whereas, if the decomposition takes place in the digester, $CO_2$ is not evolved continuously. This means that the apparatus has to be larger to take care of the batch-like liberation of $CO_2$ and, therefore, the first cost is higher. There is also another advantage which is gained by the decomposition of $NaHCO_3$, namely the digester operation is much easier.

(7) When the residual liquor is evaporated, a large amount of condensate is formed. The condensate is called secondary condensate. This condensate contains certain amounts of impurities and it cannot be used as such, for instance, as boiler feed water. In the conventional sulfate mill, this condensate is not used, only some heat of the condensate is recovered by using heat exchangers and after that the condensate is sent to a sewer. The condensate contains poisonous sulfur compounds, and of course causes contamination of the nearby waters. In the present process, the condensate does not contain poisonous sulfur compounds and it can be used to a great advantage after it has been purified with a small amount of chemicals, such as activated silica gel or aluminum sulfate or filtered through ordinary charcoal, etc. Condensate purified in this way can be used as boiler feed water and particularly it is suitable to be used as shower water on the drying machine when making high grade pulps, because it does not contain any minerals. A considerable amount of heat is likewise saved.

(8) When extra $CO_2$, is needed in the conversion process, is recovered from the flue gas which contains, besides $CO_2$, $SO_2$, $SO_3$ and alkali salts, the flue gas is scrubbed in the scrubbers in which $NaHCO_3$ is circulated. $SO_2$ reacts with alkali forming $Na_2SO_3$, $SO_3$ forming $Na_2SO_4$, the circulated solution gets dirty and it cannot be used for acid making due to the particles of soot carried with the gas. The circulated solution after becoming fortified with the chemicals is returned to the evaporator plant where it is evaporated and re-burned in the recovery unit. By doing this, the $NaHCO_3$ used for removing $SO_2$ and $SO_3$ can be recovered and re-used and also the alkali and sulfur compound in the flue gases are recovered.

(9) In many instances, it pays to make NaOH for the improved process. This is possible in connection with the new recovery system. As a raw material, $Na_2SO_4$ can be used. This salt is added to the recovery unit. Thus, $Na_2SO_4$ is reduced to $Na_2CO_3 + Na_2S$, which salts are converted by $CO_2$ into $NaHCO_3$ and $H_2S$. After decomposing $NaHCO_3$ to $Na_2CO_3 + CO_2$, sodium carbonate is causticized with CaO to NaOH. Calcium carbonate, lime mud, which is formed in the causticizing operation is disposed of. With the $CaCO_3$ mud, impurities such as insoluble silica are removed from the system which is a desired feature. $CO_2$ removed in the causticizing is replaced with $CO_2$ recovered from flue gases. Manufacturing of pure NaOH in this way has not been possible heretofore on an industrial scale for instance, in the sulfate industry, because the causticized liquor always contains sodium sulfide. The present process is therefore novel and this feature is important.

(10) It is very advantageous to use liquid $SO_2$ in the improved cooking process. Any appropriate system of recovering and liquefying $SO_2$ can be used. For example, the so-called Somer process described in the Norwegian Patent No. 73,832 or the usual procedure of compressing, cooling and liquefying. Thus, sulfur dioxide gases can be liquefied by conducting such gases into a vessel containing aqueous solution of strong acid sodium bisulfite and by taking the strong gas ($SO_2$) from the top of this vessel by means of a compressor and conducting it to the pipe for incoming gases going to a liquefaction plant. The gas on the top of the acid tank contains 8 to 10 kilograms per cubic meter of $SO_2$ and therefore the cost of compressing is very low.

Although the present invention has been described in conjunction with certain preferred embodiments, it is to be understood that modifications and variations may be resorted to without departing from the spirit and scope of the invention as those skilled in the art will readily understand. Such variations and modifications are to be considered within the purview of the application and the scope of the appended claims.

I claim:

1. The improved process of recovering chemicals and heat from residual liquor produced in a three-stage acid-neutral-alkaline process for producing pulp from fibrous material containing cellulose which comprises cooking fibrous material with a weak acid solution containing an agent of the group consisting of sulfite, bisulfite, and bisulfite with an excess of $SO_2$ of an alkali metal, producing partly digested pulp, converting said acid cooking by injecting an alkaline liquor in the digestor at the end of the acid cooking stage to an alkali cooking liquor having a pH range of about 7 to about 10.5 without separating said partly cooked pulp and without discontinuing the cooking, said injected alkaline liquor consisting essentially of a carbonate and mother liquor of an alkali metal produced in the conversion of the smelt solution produced hereinafter, cooking with said weak alkaline cooking liquor consisting essentially of a carbonate of an alkali metal to produce completely digested pulp and residual liquor while evolving strong $CO_2$ during said alkaline cooking, recovering said evolved $CO_2$, said recovered $CO_2$ constituting mainly the amount required in the subsequent treatment of a smelt solution, separating said pulp from said residual liquor, evaporating and burning said residual liquor to produce steam and a smelt consisting essentially of a carbonate of an alkali metal and a sulfide of an alkali metal, dissolving and clarifying said smelt solution, introducing gaseous $CO_2$ provided mainly by the $CO_2$ recovered in the aforesaid conversion of acid cooking liquor to alkaline cooking liquor into said smelt solution until substantially all of said sulfide of the smelt solution is converted to a bicarbonate of an alkali metal and $H_2S$ gas, separating a portion of said bicarbonate from the smelt solution, using said portion to make acid cooking liquor used in the first step, using the remaining bicarbonate and mother liquor in subsequent steps, burning said $H_2S$ gas to $SO_2$ gas, making acid cooking liquor used in the first step with said $SO_2$ under pressure and a portion of said bicarbonate produced hereinabove while causing the evolving $CO_2$ thereby producing a weak acid salt solution containing an agent of the group consisting of sulfite, bisulfite, and bisulfite with an excess of $SO_2$ of an alkali metal, and recovering strong $CO_2$ gas evolved in the foregoing steps for use in the step of treating the smelt solution to produce a bicarbonate of an alkali metal.

2. The improved process of recovering chemicals and heat from residual liquor produced in a three-stage acid-neutral-alkaline process for producing pulp from fibrous material containing cellulose which comprises cooking fibrous material with a weak acid solution containing an agent of the group consisting of sulfite, bisulfite, and bisulfite with an excess of $SO_2$ of an alkali metal, converting the cooking liquor of the first stage by injecting an alkaline solution at the end of acid cooking stage to an alkali cooking liquor having a pH range of about 7 to about 10.5 without separating the pulp and without discontinuing the cooking, said injecting alkaline liquor consisting essentially of a bicarbonate, carbonate, and a sulfide of an alkali metal produced in the conversion of the smelt solution produced hereinafter, cooking with said alkaline cooking liquor consisting essentially of a carbonate and a sulfide of an alkali metal to produce completely digested pulp and residual liquor while evolving strong $CO_2$ during said alkaline cooking, recovering said evolved $CO_2$, said $CO_2$ constituting mainly the amount required in the subsequent treatment of a smelt solution, separating said pulp from said residual liquor produced herein, evaporating and burning said residual liquor to produce steam and a smelt consisting essentially of a carbonate of an alkali metal and a sulfide of an alkali metal, dissolving smelt in water to form hot solution, adding to said hot solution an agent of the group consisting of calcium carbonate and calcium hydroxide to remove silicic acid and other impurities, clarifying said smelt solution, introducing gaseous $CO_2$ provided mainly by the $CO_2$ recovered in the aforesaid conversion of acid cooking liquor to alkaline cooking liquor into said smelt solution in such a manner that the sulfide of the smelt solution is incompletely carbonated while evolving $H_2S$ gas, crystallizing that amount of bicarbonate which is needed to make acid, separating said bicarbonate crystals from the smelt solution, and using the remaining smelt solution consisting of a bicarbonate, a carbonate, and a sulfide of an alkali metal to neutralize the acid cooking liquor of the first stage and to form the alkaline cooking liquor of the third stage, burning said $H_2S$ gas to $SO_2$ gas, making cooking liquor used in the first step from said separated bicarbonate crystals and $SO_2$ produced herein under pressure, to make weak acid cooking liquor containing an agent of the group consisting of a sulfite, bisulfite, bisulfite with an excess of an alkali metal while evolving strong $CO_2$ gas and recovering $CO_2$ gas evolved herein for use in the step of treating the smelt solution to produce a bicarbonate of an alkali metal.

3. The improved process of recovering chemicals and heat from residual liquor produced in a three-stage acid-neutral-alkaline process for producing pulp from fibrous material containing cellulose which comprises cooking fibrous material with a weak acid liquor containing an agent of the group consisting of sulfite, bisulfite, and bisulfite with an excess of $SO_2$ of an alkali metal to produce partly digested pulp, converting said acid cooking liquor at the end of the acid cooking stage to an alkaline cooking liquor having a pH range of about 7 to about 10.5 without separating the pulp and without discontinuing the cooking, said alkali cooking liquor consisting essentially of a crystallized carbonate of an alkali metal produced in the conversion of the smelt solution produced hereinafter, evolving strong $CO_2$ from said liquor, recovering said evolved $CO_2$, said $CO_2$ constituting primarily the amount required in the subsequent treatment of a smelt solution, cooking with said weak alkaline cooking liquor consisting essentially of a carbonate of an alkali metal to produce completely digested pulp and residual liquor, evolving strong $CO_2$ during said cooking, separating said pulp from said residual liquor, evaporating and burning said residual liquor to produce steam and a smelt consisting essentially of a carbonate of an alkali metal and a sulfide of an alkali metal, dissolving said smelt in water to form a hot solution, adding to said hot solution an agent of the group consisting of calcium carbonate and calcium hydroxide to remove silicic acid and other impurities, clarifying said smelt solution, cooling said smelt solution prior to treating same with an excess of $CO_2$ under pressure provided primarily by the $CO_2$ recovered from the aforesaid conversion of acid cooking liquor to alkaline cooking liquor, controlling the temperature of said smelt solution while treating with $CO_2$ gas until substantially all of said sulfide of an alkali metal is converted to bicarbonate and $H_2S$ gas, crystallizing said bicarbonate in said smelt solution, separating said smelt solution into mother liquor and said crystallized bicarbonate, using said separated crystallized bicarbonate in neutralizing the acid cooking liquor of the first stage and in forming the alkaline cooking liquor of the third stage, burning said $H_2S$ gas to $SO_2$ gas, making weak acid cooking liquor used in the first stage from the mother liquor and from $SO_2$ under pressure, said acid cooking liquor containing an agent of the group consisting of sulfite, bisulfite, and bisulfite with an excess of $SO_2$ of an alkali metal, evolving strong $CO_2$ during the making of acid cooking liquor, and recovering strong $CO_2$ gas evolved herein for use in the step of treating the smelt solution to produce a bicarbonate of an alkali metal.

4. The improved process of recovering chemicals and heat from residual liquor produced in a three-stage acid-neutral-alkaline process for producing pulp from fibrous material containing cellulose which comprises cooking fibrous material with a weak acid solution containing an agent of the group consisting of sulfite, bisulfite, and bisulfite with an excess of $SO_2$ of an alkali metal to produce partly cooked pulp, converting acid cooking liquor used in the first stage at the end of the acid cooking stage by injecting alkaline liquor to form an alkaline cooking liquor having a pH range of about 7 to about 10.5 without separating said partly cooked pulp and without discontinuing the cooking, said injecting alkaline liquor consisting essentially of decomposed bicarbonate and the mother liquor produced hereinafter in the conversion of the smelt solution produced herein, evolving strong $CO_2$, recovering said evolved $CO_2$, said $CO_2$ constituting primarily the amount required in the subsequent treatment of a smelt solution, cooking with said weak alkaline cooking liquor consisting essentially of a carbonate of an alkali metal to produce completely digested pulp and residual liquor, evolving strong $CO_2$ during said alkaline cooking, separating said pulp from said residual liquor, evaporating and burning said residual liquor to produce steam and a smelt consisting essentially of a carbonate of an alkali metal and a sulfide of an alkali metal, dissolving smelt in water to form a hot solution, adding to said hot solution an agent of the group consisting of calcium carbonate and calcium hydroxide to remove silicic acid and other impurities, clarifying said smelt solution, cooling said smelt solution prior to treating it with an excess of $CO_2$ gas under pressure provided primarily by the $CO_2$ recovered from the aforesaid conversion of acid cooking liquor to alkaline cooking liquor, controlling the temperature of said smelt solution during said treatment with $CO_2$, continuing the treatment of said smelt solution with $CO_2$ gas under pressure while cooling the solution until substantially all said sulfide is converted to a bicarbonate and $H_2S$, crystallizing said bicarbonate in said smelt solution, separating said smelt solution into mother liquor and said crystallized bicarbonate, using a portion of said bicarbonate to make acid, decomposing the remaining bicarbonate crystals and mother liquor, producing a carbonate of an alkali metal and evolving strong $CO_2$ gas, using said decomposed bicarbonate and said mother liquor in neutralizing the acid cooking liquor and in forming alkaline cooking liquor, burning said $H_2S$ gas to $SO_2$ gas, making acid cooking liquor used in the first stage from said bicarbonate and $SO_2$ produced herein by reacting a sulfite of an alkali metal with a portion of $SO_2$ until bisulfite of an alkali metal is formed, by neutralizing said bisulfite with a bicarbonate in a vessel under pressure, by taking about one-half of said sulfite produced herein with $SO_2$ to form bisulfite and by reacting the remaining sulfite with remaining $SO_2$ thereby producing a weak acid cooking liquor containing an agent of the group consisting of sulfite, bisulfite, and bisulfite with an excess of $SO_2$ of an alkali metal, and recovering substantially all $CO_2$ gas evolved herein for use in the step of treating the smelt solution to produce a bicarbonate of an alkali metal.

5. The improved process of recovering chemicals and heat from residual liquor produced in a three-stage acid-neutral-alkaline process for producing pulp from fibrous material containing cellulose which comprises cooking fibrous material with an acid liquor containing an agent of the group consisting of sodium sulfite, bisulfite, and bisulfite with an excess of $SO_2$ to produce partly cooked pulp, converting the acid cooking liquor by injecting an alkali into the digester at the end of the acid cooking stage to an alkaline cooking liquor having a pH range of about 7 to about 10.5 without separating the pulp and without discontinuing the cooking, said injecting alkaline liquor consisting of a carbonate and mother liquor produced hereinafter by the conversion of a smelt solution, evolving strong $CO_2$ gas, recovering said evolved $CO_2$ gas, said $CO_2$ constituting primarily the amount required in the subsequent treatment of a smelt solution, cooking with said alkaline liquor to produce completely digested pulp and residual liquor, separating said pulp from the residual liquor, evaporating and burning said residual liquor to produce steam and a smelt containing mainly $Na_2CO_3$ and $Na_2S$, dissolving and clarifying said smelt solution, cooling said smelt solution prior to treatment with $CO_2$, treating said smelt solution under pressure with an excess of $CO_2$ gas provided primarily by the $CO_2$ recovered from the aforesaid conversion of acid cooking liquor to alkaline cooking liquor until substantially all of $Na_2S$ is converted to $NaHCO_3$ and $H_2S$ gas while controlling the temperature of said smelt solution during said treatment to a range of about 30° C. to about 40° C., crystallizing said bicarbonate in said solution, separating said smelt into mother liquor and said crystallized $NaHCO_3$, using a portion of said crystallized $NaHCO_3$ to make acid, using the remaining crystallized $NaHCO_3$ and the mother liquor in neutralizing the acid cooking liquor and in forming alkaline cooking liquor, burning said $H_2S$ gas to $SO_2$ gas, making acid cooking liquor used in the first stage from a portion of said bicarbonate and said $SO_2$ under pressure, said cooking liquor containing an agent of the group consisting of sodium sulfite and bisulfite, evolving strong $CO_2$ gas, and recovering substantially all of $CO_2$ gas evolved herein for use in the step of treating the smelt solution to produce a bicarbonate of an alkali metal.

6. The improved process of recovering chemicals and heat from residual liquor produced in a three-stage acid-neutral-alkaline process for producing pulp from fibrous material containing cellulose which comprises cooking fibrous material with a weak acid solution containing an agent of the group consisting of sodium sulfite, bisulfite, and bisulfite with an excess of $SO_2$ of an alkali metal to produce partly cooked pulp, converting the acid cooking liquor at the end of the first stage to an alkali cooking liquor having a pH range of about 7 to about 10.5, without separating said partly cooked pulp and without discontinuing the cooking by injecting in said cooking liquor alkali compounds consisting essentially of a carbonate of sodium and to minor extent compounds of sodium and sulfur including sodium thiosulfate and polysulfides, evolving strong $CO_2$ gas, recovering said evolved $CO_2$ gas, said $CO_2$ gas constituting primarily the amount required in the subsequent treatment of a smelt solution, cooking with said weak alkaline cooking liquor consisting essentially of a carbonate of sodium and compounds of sodium and sulfur derived from prior cooking operations and alkali injection thereby producing completely cooked pulp, evolving strong $CO_2$ during the alkaline cooking, separating said pulp from said residual liquor, evaporating and burning said residual liquor to produce steam and a smelt consisting essentially of a carbonate of sodium and a sulfide of sodium, evaporating said residual liquor and burning the same to produce a smelt, dissolving said smelt in water to form a hot solution, adding to said hot solution an agent of the group consisting of calcium carbonate and calcium hydroxide to remove silicic acid and other impurities, clarifying said smelt solution, cooling said smelt solution prior to treatment with $CO_2$, treating said smelt solution under pressure with an excess of $CO_2$ gas provided primarily by the $CO_2$ recovered from the aforesaid conversion of acid cooking liquor to alkaline cooking liquor until substantially all of $Na_2S$ is converted to $NaHCO_3$ and to $H_2S$ gas while controlling the temperature of said smelt solution during said treatment to a range of about 30° C. to about 40° C., crystallizing bicarbonate of sodium in said solution, separating said smelt solution into mother liquor and crystallized $NaHCO_3$, using a portion of said crystallized bicarbonate to make acid and the remaining bicarbonate crystals and mother liquor containing to a minor extent sodium thiosulfate, sodium polysulfide and other compounds of sodium and sulfur in the conversion step and the formation of said alkaline cooking liquor, burning said $H_2S$ gas to $SO_2$ gas, making the acid cooking liquor for use in the first stage from said bicarbonate and $SO_2$, the acid making involving reacting $Na_2SO_3$ with a portion of $SO_2$ produced until $NaHSO_3$ is formed, neutralizing said $NaHSO_3$ with said $NaHCO_3$, under pressure to form $Na_2SO_3$, taking about one-half of said $Na_2SO_3$ formed herein and reacting the same with $SO_2$, reacting the remaining $Na_2SO_3$ with the remaining $SO_2$ thereby producing a weak acid salt solution containing an agent of the group consisting of $Na_2SO_3$, $NaHSO_3$, and $NaHSO_3$ with an excess of $SO_2$, recovering substantially all of the $CO_2$ gas evolved herein, and using the same herein for the treatment of the smelt solution to produce $NaHCO_3$.

7. The improved process of recovering chemicals and heat from residual liquor produced in a three-stage acid-neutral-alkaline process for producing pulp from fibrous material containing cellulose which comprises cooking fibrous material with a weak acid salt solution containing an agent of the group of sodium sulfite, bisulfite, and bisulfite with an excess of $SO_2$, controlling the acid fibrous material ratio to a low ratio of the order of about 3:1, continuing the acid cooking to produce partly cooked pulp, converting said acid cooking by injecting an alkali liquor into the digester at the end of the acid cooking stage to an alkaline cooking liquor having a pH range of about 7 to 10.5 without separating the cooked pulp and without discontinuing the cooking, said injection alkali liquor consisting essentially of a carbonate and mother liquor of sodium produced by the conversion of a smelt solution hereinafter, evolving strong $CO_2$, recovering said evolved $CO_2$, said $CO_2$ constituting primarily the amount required in the subsequent treatment of a smelt solution, cooking with said weak alkaline cooking liquor consisting essentially of a carbonate of sodium to produce completely digested pulp and residual liquor, evolving strong $CO_2$ during said alkaline cooking, separating said pulp from said residual liquor, evaporating said residual liquor, recovering secondary condensate produced in said evaporation of said residual liquor for use in various steps of said three stages, burning said evaporated liquor to produce steam and a smelt consisting essentially of $Na_2Co_3$ and $Na_2S$, dissolving said smelt in water to form a hot solution, adding to said hot solution an agent of the group consisting of $CaCO_3$ and $Ca(OH)_2$ to remove silicic acid and other impurities, clarifying said smelt solution, cooling said smelt solution prior to treatment with $CO_2$, treating said smelt solution under pressure with an excess of $CO_2$ gas provided primarily by the $CO_2$ recovered from the aforesaid conversion of acid cooking liquor to alkaline cooking liquor until substantially all of $Na_2S$ is converted to $NaHCO_3$ and to $H_2S$ gas while controlling the temperature of said smelt solution during said treatment, crystallizing bicarbonate in said solution, separating said smelt into mother liquor and said crystallized $NaHCO_3$, using a portion of said $NaHCO_3$ to make acid and remaining $NaHCO_3$ crystals and mother liquor in the neutralizing of acid cooking liquor and the formation of said alkaline cooking liquor, burning said $H_2S$ gas to $SO_2$ gas, producing acid cooking liquor for use in the first stage from said bicarbonate and $SO_2$, the acid making involving reacting $Na_2SO_3$ with a portion of $SO_2$ until $NaHSO_3$ is formed, neutralizing said $NaHSO_3$ with said $NaHCO_3$ under pressure, taking about one-half of said $Na_2SO_3$ and reacting the same with $SO_2$, reacting the remaining $Na_2SO_3$ with the remaining $SO_2$, thereby producing an acid cooking liquor containing an agent of the group consisting of $Na_2SO_3$, $NaHSO_3$, and $NaHSO_3$ with excess of $SO_2$, and recovering substantially all of the $CO_2$ gas evolved herein for use in the step of treating the smelt solution to produce $NaHCO_3$.

8. The improved process of recovering chemicals and heat from residual liquor produced in a three-stage acid-neutral-alkaline process for producing pulp from fibrous material containing cellulose which comprises cooking fibrous material in a digester with a weak acid solution containing an agent of the group consisting of $Na_2SO_3$, $NaHSO_3$, and $NaHSO_3$ with an excess of $SO_2$, controlling the acid/fibrous material ratio to a low ratio of the order of about 3:1, bleeding some of the acid cooking liquor from the digester at the end of acid cooking stage for use in the various operations hereof, converting the acid cooking liquor by injecting an alkali liquor into the digester at the end of the acid cooking stage to an alkaline cooking liquor having a pH range of about 7 to about 10.5 without separating the pulp and without discontinuing the cooking, said injection alkali liquor consisting of a carbonate of sodium and mother liquor of sodium produced hereinafter in the conversion of a smelt solution, evolving strong $CO_2$ gas, recovering said evolved $CO_2$ gas, said $CO_2$ gas constituting firstly the amount required in the subsequent treatment of a smelt solution, cooking with said alkaline liquor to produce completely digested pulp and residual liquor, separating said pulp from the residual liquor, evaporating and burning said residual liquor in a furnace to produce steam and a smelt containing mainly $Na_2CO_3$ of metal and $Na_2S$, dissolving said smelt to form a solution and clarifying said smelt solution, cooling said smelt solution prior to treatment with $CO_2$, treating said smelt solution under pressure with an excess of $CO_2$ gas provided firstly by the $CO_2$ recovered from the conversion of acid cooking liquor to alkaline cooking liquor until substantially all of $Na_2S$ is converted to $NaHCO_3$ and to $H_2S$ gas while controlling the temperature of said smelt solution during said treatment, crystallizing said bicarbonate in said solution, separating said salt into mother liquor and said crystallized $NaHCO_3$, using a portion of said $NaHCO_3$ to make acid and the remaining $NaHCO_3$ crystals and acid mother liquor in neutralizing the acid cooking liquor and the formation of the alkaline cooking liquor, burning said $H_2S$ gas to $SO_2$ gas producing acid cooking liquor used in the first stage from said bicarbonate produced herein and $SO_2$ produced herein, the acid making involving reacting $Na_2SO_3$ with a portion of $SO_2$ until $NaHSO_3$ is formed, neutralizing said $NaHSO_3$ with said $NaHCO_3$ under pressure, taking about one-half of said $Na_2SO_3$ and reacting the same with $SO_2$ and reacting the remaining $Na_2SO_3$ with the remaining $SO_2$, the cooking liquor so produced containing an agent of the group consisting of $Na_2SO_3$, $NaHSO_3$ and $NaHSO_3$ with an excess of $SO_2$, recovering $CO_2$ evolved herein from the decomposition of $NaHCO_3$ and from auxiliary operations including the neutralization of the liquor bled from the digester and from the flue gases coming from said furnace, and liquefying a portion of the $SO_2$ produced herein for use in the first stage of cooking in a weak acid solution.

9. The improved process of recovering chemicals from liquor produced in pulping processes using as the cooking agent a solution containing an agent of the group consisting of sulfite, bisulfite, and bisulfite with an excess of $SO_2$ of an alkali metal comprising converting cooking liquor after finishing acid cooking to an alkaline liquor by treatment with a carbonate of an alkali metal while evolving and recovering $CO_2$ under pressure, said recovered $CO_2$ constituting mainly the amount required in the subsequent treatment of a smelt solution, evaporating said alkaline liquor, burning said evaporated alkaline liquor under reducing conditions, producing a smelt containing mainly sulfide and carbonate of an alkali metal, dissolving said smelt to form a smelt solution, clarifying said smelt solution, cooling said smelt solution, treating said cooled smelt solution with gaseous $CO_2$ under pressure provided mainly by the $CO_2$ recovered from the aforesaid conversion of acid cooking liquor to alkaline liquor thereby producing bicarbonate crystals of an alkali metal and $H_2S$ gas, separating a portion of bicarbonate crystals to make acid cooking liquor, using the remainder of said bicarbonate crystals and mother liquor for converting the aforesaid cooking liquor to said alkaline liquor, burning said $H_2S$ to $SO_2$ gas, making acid cooking liquor from said separated bicarbonate crystals and from said $SO_2$ gas while evolving strong $CO_2$ gas under pressure, said acid cooking liquor containing an agent of the group consisting of sulfite, bisulfite, and bisulfite with an excess of $SO_2$ of an alkali metal, and recovering said evolved $CO_2$ gas for re-use in treating smelt solution.

10. The improved process of recovering chemicals and heat from liquor produced in pulping processes using as the cooking agent a solution containing an agent of the group consisting of sulfite, bisulfite, and bisulfite with an excess of $SO_2$ of an alkali metal comprising converting acid cooking liquor after finishing acid cooking to an alkaline liquor having a pH range of about 7 to about 10.5 by treatment with a carbonate of an alkali metal while evolving and recovering substantially pure $CO_2$ under pressure, said recovered $CO_2$ constituting mainly the amount required in the subsequent treatment of a smelt solution, evaporating said alkaline liquor, burning said evaporated alkaline liquor under reducing conditions to produce a smelt containing mainly sulfide and carbonate of an alkali metal while recovering heat, dissolving said smelt to form a smelt solution, clarifying said smelt solution, cooling said smelt solution, treating said cooled smelt solution with said recovered substantially pure gaseous $CO_2$ under pressure provided mainly by the $CO_2$ recovered from the conversion of acid cooking liquor to alkaline liquor thereby producing bicarbonate crystals of an alkali metal and $H_2S$ gas, separating a portion of bicarbonate crystals to make acid cooking liquor, using the remainder of said bicarbonate crystals and mother liquor for converting the aforesaid cooking liquor to said alkaline liquor, burning said $H_2S$ to $SO_2$ gas, making acid cooking liquor from said separated bicarbonate crystals and from said $SO_2$ gas under pressure while evolving substantially pure $CO_2$ gas, said acid cooking liquor containing an agent of the group consisting of sulfite, bisulfite, and bisulfite with an excess of $SO_2$ of an alkali metal, and recovering said evolved, substantially pure $CO_2$ gas for re-use in treating smelt solution.

11. The improved process of recovering chemicals and heat from liquors produced in a pulping process which comprises cooking fibrous material in a digester with an acid solution containing an agent of the group consisting of $Na_2SO_3$, $NaHSO_3$, and $NaHSO_3$ with an excess of $SO_2$, converting the acid cooking liquor at the end of the acid cooking stage to an alkaline liquor having a pH range of about 7 to about 10.5 by adding an alkaline liquor, said added alkaline liquor consisting of a carbonate of sodium and mother liquor produced hereinafter in the conversion of a smelt solution, evolving $CO_2$ gas under pressure, recovering said evolved $CO_2$ gas, said recovered $CO_2$ gas constituting mainly the amount required in the subsequent treatment of a smelt solution, evaporating said alkaline liquor, burning said evaporated alkaline liquor under reducing conditions to produce a smelt containing mainly sulfide and carbonate of sodium, dissolving said smelt in water to form a smelt solution, clarifying said smelt solution, cooling said smelt solution containing sulfide and carbonate of sodium to a temperature of about 30° C. to about 40° C., carbonating said cooled smelt solution with an excess of gaseous carbon dioxide under pressure provided mainly by the $CO_2$ recovered in the aforesaid conversion of acid cooking liquor to alkaline liquor to produce a slurry containing crystals of sodium bicarbonate and to evolve $H_2S$ while continuing to cool the solution undergoing carbonation, filtering said slurry to remove bicarbonate crystals and to leave a solution containing bicarbonate of sodium as an alkaline mother liquor, using mother liquor containing a carbonate of sodium to convert the acid cooking liquor to alkaline liquor, adding water to the aforesaid bicarbonate crystals to form an aqueous mass consisting of a member of the group consisting of a slurry and a solution, decomposing said bicarbonate to evolve substantially pure carbon dioxide under pressure and to make a fresh solution containing a carbonate of sodium, burning the aforesaid $H_2S$ gas to form $SO_2$ gas, treating a solution of $Na_2SO_3$ with $SO_2$ gas to form a solution of $NaHSO_3$ while venting waste gases therefrom, neutralizing said solution containing sodium bisulfite with said fresh carbonate solution to produce a sulfite solution while evolving substantially pure carbon dioxide under pressure, dividing said solution containing sodium sulfite into two portions, using one portion of said sulfite solution in the aforesaid step to form a bisulfite solution whereby a gas-free bisulfite solution is available for the aforesaid neutralization with the fresh carbonate solution, treating said second portion of sulfite solution with $SO_2$ gas to produce an acid cooking liquor containing sodium sulfite, sodium bisulfite, and sodium bisulfite and excess sulfur dioxide for cooking in the pulping process, and collecting the carbon dioxide evolved in the aforesaid operations under pressure for re-use in the treatment of the smelt solution.

References Cited in the file of this patent

UNITED STATES PATENTS

| | | |
|---|---|---|
| 1,605,927 | Drewsen | Nov. 9, 1926 |
| 1,787,953 | Richter | Jan. 6, 1931 |
| 1,787,954 | Richter | Jan. 6, 1931 |
| 1,934,655 | Bradley et al. | Nov. 7, 1933 |
| 1,983,789 | Bradley et al. | Dec. 11, 1934 |
| 2,192,239 | Palmrose | Mar. 5, 1940 |
| 2,221,066 | Kahle | Nov. 12, 1940 |

FOREIGN PATENTS

| | | |
|---|---|---|
| 43,716 | Norway | Feb. 14, 1927 |
| 87,098 | Sweden | Aug. 11, 1936 |